United States Patent
Monow et al.

(10) Patent No.: US 6,368,646 B1
(45) Date of Patent: Apr. 9, 2002

(54) LIQUID CANDY DISPENSER

(75) Inventors: Steven Monow, Fairfield; Jason Harris, San Rafael, both of CA (US)

(73) Assignee: Oddzon, Inc., Pawtucket, RI (US)

( * ) Notice: Subject to any disclaimer, the term of this patent is extended or adjusted under 35 U.S.C. 154(b) by 0 days.

(21) Appl. No.: 09/330,622

(22) Filed: Jun. 11, 1999

(51) Int. Cl.⁷ .............................. A23G 3/00
(52) U.S. Cl. .............. 426/115; 426/104; 426/112; 446/475; 446/74; 222/78
(58) Field of Search .............. 426/115, 104, 426/134, 112, 394; 446/475, 74; 222/78; 221/24

(56) References Cited

U.S. PATENT DOCUMENTS

| | | | |
|---|---|---|---|
| 691,266 A | * 1/1902 | Hill | 446/180 |
| 1,340,043 A | 5/1920 | Grace | 222/390 |
| 1,484,331 A | 2/1924 | Hopkins | 206/384 |
| 2,121,185 A | 6/1938 | Claff | 99/183 |
| 2,252,119 A | 8/1941 | Edmonds | 30/125 |
| 2,421,711 A | 6/1947 | Moots et al. | 222/82 |
| 2,517,027 A | 8/1950 | Rado | 222/94 |
| 2,766,123 A | 10/1956 | Moubayed | 99/137 |
| 2,771,219 A | * 11/1956 | Dewey | 222/93 |
| 3,105,612 A | 10/1963 | Krasnoff et al. | 222/78 |
| 3,116,152 A | 12/1963 | Smith | 99/171 |
| 3,178,060 A | * 4/1965 | Bossack | 222/78 |
| 3,545,980 A | 12/1970 | Stanger | 99/138 |
| 3,821,425 A | 6/1974 | Russell | 426/110 |
| 4,193,517 A | * 3/1980 | Fetty et al. | 222/78 |
| 4,229,482 A | 10/1980 | Kreske, Jr. | 426/134 |
| 4,452,823 A | 6/1984 | Connolly et al. | 426/115 |
| 4,518,367 A | * 5/1985 | Zaruba et al. | 446/373 |
| 4,574,987 A | 3/1986 | Halligan et al. | 222/107 |
| 4,630,756 A | * 12/1986 | Amici et al. | 222/78 |
| 4,798,313 A | 1/1989 | Farley | 222/192 |
| 4,830,222 A | 5/1989 | Read | 222/106 |
| 4,888,188 A | 12/1989 | Castner, Sr. et al. | 426/109 |
| 5,324,527 A | 6/1994 | Coleman | 426/134 |

FOREIGN PATENT DOCUMENTS

| FR | 2 604 061 | 3/1988 | A23G/3/00 |
|---|---|---|---|

OTHER PUBLICATIONS

Skull Suckers™ prior art drawing.

* cited by examiner

*Primary Examiner*—Milton I. Cano
*Assistant Examiner*—Robert Madsen
(74) *Attorney, Agent, or Firm*—Marshall, Gerstein, & Borun

(57) ABSTRACT

A liquid candy dispenser is provided with a liquid candy supply member with an internal cavity, a supply of liquid candy disposed in the liquid candy supply member, a body part member shaped in the form of a human body part, a liquid candy dispensing hole formed in the body part member at a location corresponding to an area of the body part at which a body-part substance would be present, a liquid conduit fluidly coupled between the liquid candy supply member and the liquid candy dispensing hole, and a pumping mechanism associated with the liquid candy supply member. The pumping mechanism forces liquid candy from the internal cavity of the liquid candy supply member, through the liquid conduit fluidly coupled between the liquid candy supply member and the liquid candy dispensing hole, and out of the liquid candy dispensing hole so that the liquid candy exits the dispensing hole formed in the body part member to simulate the presence of the body-part substance on the human body part. The body part member may be selected from the group of shaped members consisting of an ear-shaped member, a nose-shaped member, and foot-shaped member.

29 Claims, 4 Drawing Sheets

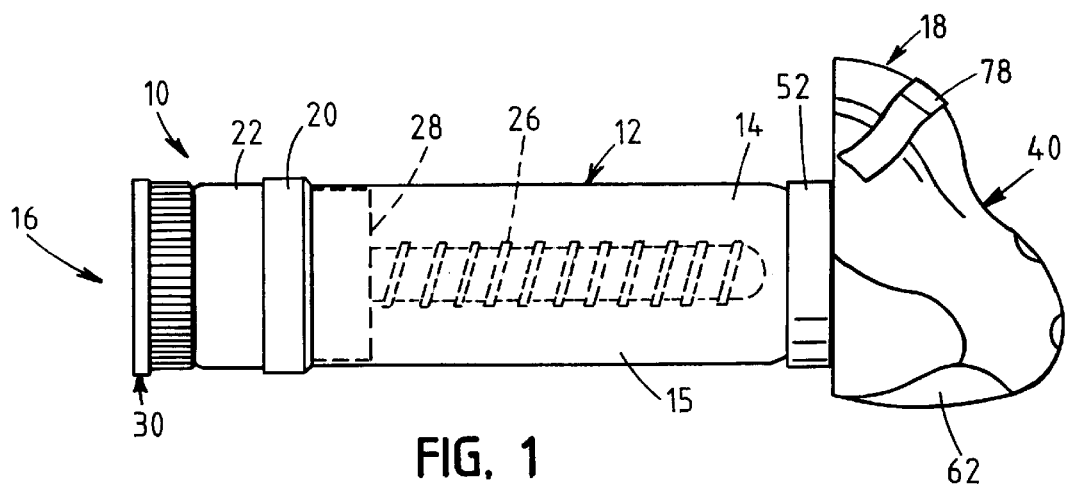
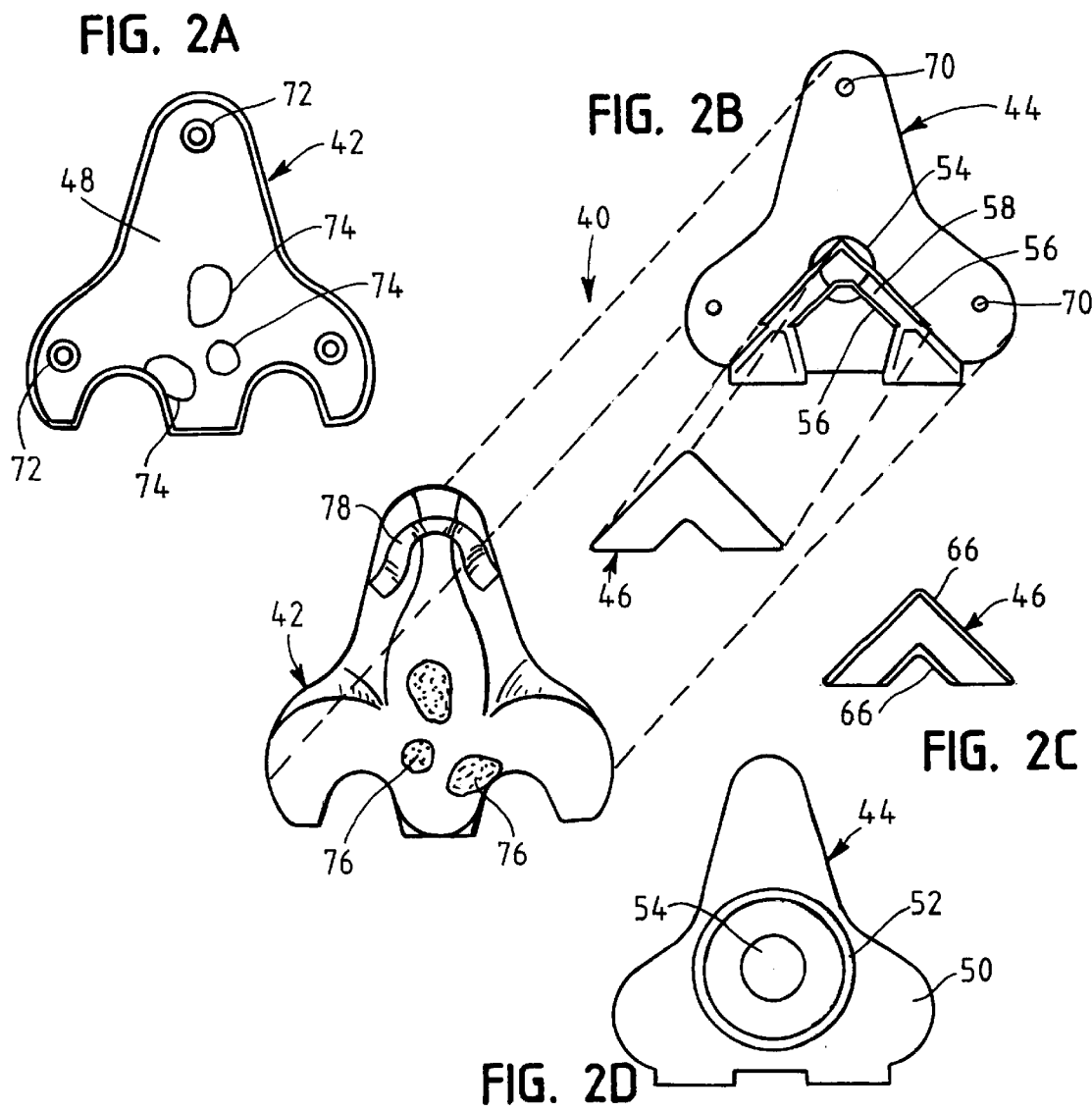

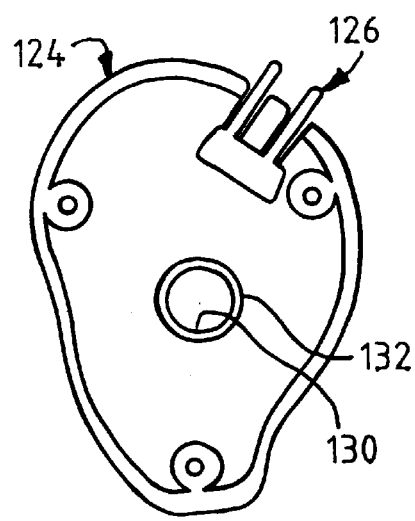
FIG. 4A
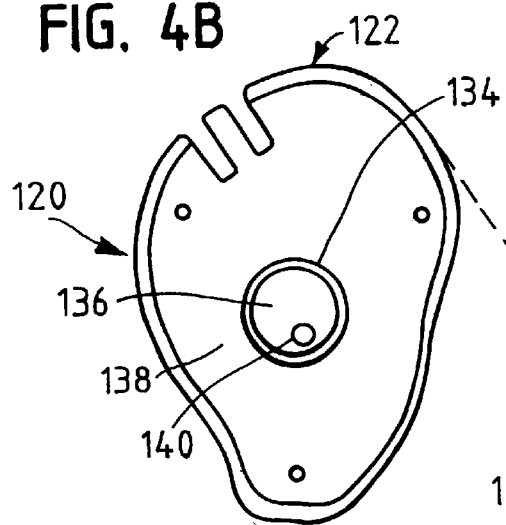
FIG. 4B
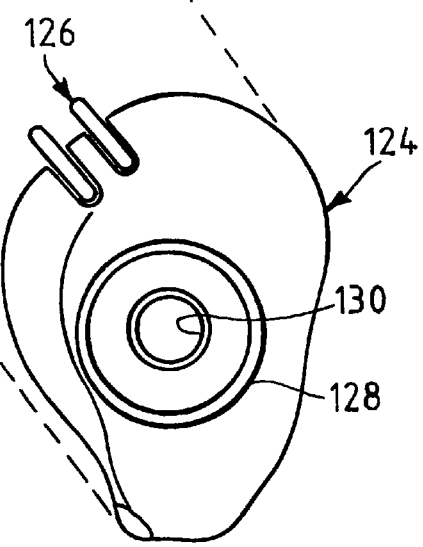
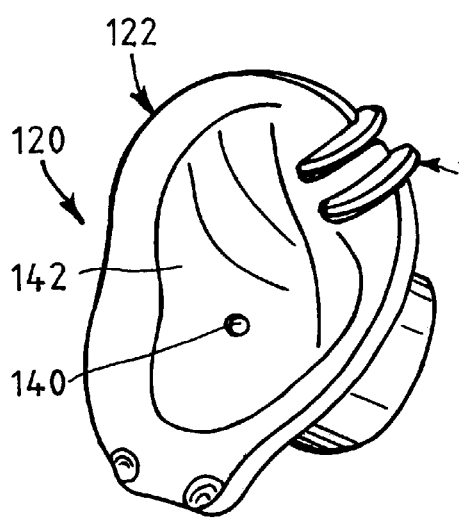
FIG. 4C

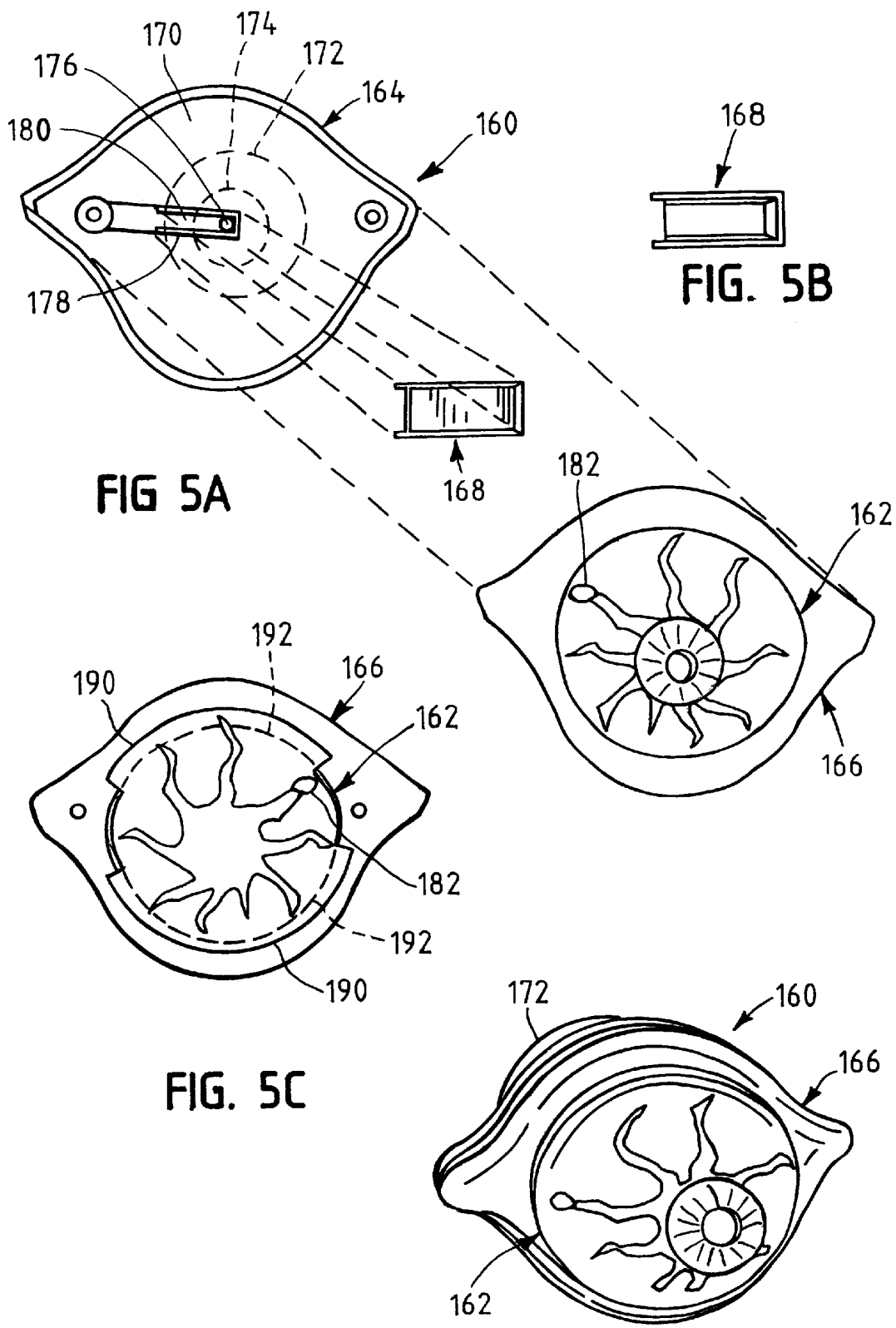

LIQUID CANDY DISPENSER

BACKGROUND OF THE INVENTION

The present invention is directed to a liquid candy dispenser which is adapted to dispense liquid candy from a candy reservoir through a dispensing member shaped like a human body part.

U.S. Pat. No. 5,324,527 to Cowman discloses a candy sucker and liquid candy dispensing assembly having a spherical sucker-type candy piece 28 through which edible liquid filling may be forced. As shown in FIGS. 1 and 3 of the Cowman patent, the candy piece 28 has a plurality of fluid channels 30 formed therein through which the edible filling passes. The edible filling is disposed in a reservoir 19, and, in the embodiment disclosed in FIG. 3, a pumping mechanism is provided to pump the edible filling from the reservoir 19, through a hollow tube 26 attached to the candy piece 28, and through the channels 30 formed in the candy piece 28.

SUMMARY OF THE INVENTION

In one aspect, the invention is directed to a liquid candy dispenser having a liquid candy supply member with an internal cavity, a supply of liquid candy disposed in the internal cavity of the liquid candy supply member, a body part member shaped in the form of a human body part, a liquid candy dispensing hole formed in the body part member at a location corresponding to an area of the body part at which a body-part substance would be present, a liquid conduit fluidly coupled between the liquid candy supply member and the liquid candy dispensing hole, and a pumping mechanism associated with the liquid candy supply member.

The pumping mechanism forces liquid candy from the internal cavity of the liquid candy supply member, through the liquid conduit fluidly coupled between the liquid candy supply member and the liquid candy dispensing hole, and out of the liquid candy dispensing hole so that the liquid candy exits the dispensing hole formed in the body part member to simulate the presence of the body-part substance on the human body part.

The body part member is selected from the group of shaped members consisting of an ear-shaped member, a nose-shaped member, and foot-shaped member. If the body part member is an ear-shaped member, the body part member is provided with a simulated ear canal and the liquid candy dispensing hole is formed to coincide with the simulated ear canal. If the body part member is a nose-shaped member, the body part member is provided with a simulated nostril and the liquid candy dispensing hole is formed to coincide with the simulated nostril. If the body part member is a foot-shaped member, the foot-shaped member is provided with a plurality of toes and the liquid candy dispensing hole is formed at a location on the foot-shaped member.

In another aspect, the invention is directed to a liquid candy dispenser having a liquid candy supply member with an internal cavity, a supply of liquid candy disposed in the internal cavity of the liquid candy supply member, a body part member shaped in the form of a human body part, a liquid candy dispensing hole formed in the body part member at a location corresponding to an area of the body part at which a body-part substance would be present, a liquid conduit fluidly coupled between the liquid candy supply member and the liquid candy dispensing hole, and a pumping mechanism associated with the liquid candy supply member.

The pumping mechanism forces liquid candy from the internal cavity of the liquid candy supply member, through the liquid conduit fluidly coupled between the liquid candy supply member and the liquid candy dispensing hole, and out of the liquid candy dispensing hole so that the liquid candy exits the dispensing hole formed in the body part member to simulate the presence of the body-part substance on the human body part.

The body part member has a hollow interior portion, and the liquid conduit is shaped so as to prevent the liquid candy from entering the hollow interior portion of the body part member when the pumping mechanism causes the liquid candy to be forced from the internal cavity of the liquid candy supply member out of the liquid candy dispensing hole.

In another aspect, the invention is directed to a liquid candy dispenser having a liquid candy supply member with an internal cavity, a supply of liquid candy disposed in the internal cavity of the liquid candy supply member, a body part member shaped in the form of a human body part and composed of a non-edible material having substantially no flavor or taste associated therewith so that the liquid candy does not affect the taste of the body part member, a liquid candy dispensing hole formed in the body part member, and a liquid conduit fluidly coupled between the liquid candy supply member and the liquid candy dispensing hole so that liquid candy may flow from the internal cavity of the liquid candy supply member, through the liquid conduit fluidly coupled between the liquid candy supply member and the liquid candy dispensing hole, and out of the liquid candy dispensing hole to exit the dispensing hole formed in the body part member.

The features and advantages of the present invention will be apparent to those of ordinary skill in the art in view of the detailed description of the preferred embodiment, which is made with reference to the drawings, a brief description of which is provided below.

BRIEF DESCRIPTION OF THE DRAWINGS

FIG. 1 is a side view of a preferred embodiment of a liquid candy dispenser in accordance with the invention;

FIGS. 2A–2E show various views of a nose-shaped member that can be utilized with the liquid candy dispenser of FIG. 1;

FIGS. 4A–4C show various views of an ear-shaped member that can be utilized with the liquid candy dispenser of FIG. 1; and FIGS. 5A–5D show various views of an eye-shaped member that can be utilized with the liquid candy dispenser of FIG. 1.

DETAILED DESCRIPTION OF THE PREFERRED EMBODIMENTS

Figure 2E:
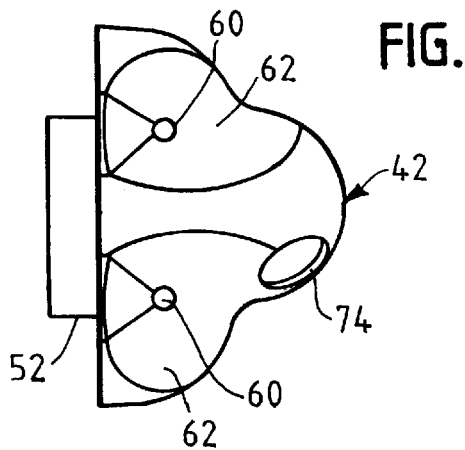

FIG. 1 illustrates an embodiment of a liquid candy dispenser 10 in accordance with the invention. Referring to FIG. 1, the liquid candy dispenser 10 has a liquid candy supply member in the form of a hollow tube 12 having an internal cavity 14 with liquid candy 15 disposed within the internal cavity 14. The candy dispenser 10 has a pumping mechanism 16 disposed at one end of the candy supply tube 12, and a dispensing member in the form of a body part member 18 is disposed at the other end of the supply tube 12.

As described below, the pumping mechanism 16 is used to pump the liquid candy 15 from the internal cavity 14 of the supply tube 12, through the interior of the body part member 18, and through a liquid dispensing hole formed in the body part member 18 so that the liquid candy 15 can be eaten by licking it off of the body part member 18. As used herein, the term "liquid candy" refers to any liquid material that is intended to be eaten and that has a viscosity suitable for use in a liquid candy dispenser of the type described herein.

The candy supply tube 12 may be provided with a slightly enlarged end portion 20 which is sealed to a closure member 22 to prevent leakage of the liquid candy 15. The pumping mechanism 16 may comprise a screw member 26 disposed within the supply tube 12, a translatable piston 28 having a central threaded bore (not shown) and being threaded onto the screw member 26, and an actuator knob 30 fixed to, or integrally formed with, the screw member 26. Rotation of the actuator knob 30 of the pumping mechanism 16 causes rotation of the screw member 26 fixed to the actuator knob 30, and the rotation of the screw member 26 causes the piston 28 to translate linearly within the interior of the supply tube 12. As the piston 28 translates from left to right in FIG. 1, it forces the liquid candy 15 out of the candy dispenser 10, as described below. Where the supply tube 12 has a circular cross section, the piston 28 translates, and does not rotate with the screw member 26, due to the friction between the piston 28 and the inner wall of the supply tube 12.

Although one type of pumping mechanism has been described above, the particular type of pumping mechanism used is not considered important to the invention, and other types of pumping mechanisms could be used. For example, a pumping mechanism similar to that of a syringe could be used, in which case a rubber or plastic cylinder could be provided inside the supply tube 12, with the cylinder fixed to the end of a plunger, so that pressing the plunger into the supply tube 12 would cause the liquid candy 15 to be pumped.

Alternatively, the pumping mechanism 16 could be provided as a plurality of accordion-type structures, such as folds or creases, in a supply tube composed of a flexible material. In that case, the supply tube could be gradually compressed in a direction parallel to its length so that the liquid candy would be pumped as the supply tube decreased in length. Other pumping mechanisms could be utilized, such as those disclosed in U.S. Pat. No. 5,324,527 to Cowman, which is incorporated by reference herein.

Referring to FIGS. 2A–2E, in one embodiment of the candy dispenser 10, the body part member 18 may comprise a nose-shaped member 40. The nose-shaped member 40 may comprise a first nose-shaped outer piece 42, a mounting piece 44 coupled to the nose-shaped outer piece 42 that facilitates mounting of the nose-shaped member 40 to the supply tube 12, and a V-shaped flow-directing member 46 disposed within a hollow portion 48 within the nose-shaped member 40.

Referring to FIG. 2D, which illustrates the side of the mounting piece 44 adjacent the supply tube 12, the mounting piece 44 has a generally flat face 50, an annular portion 52 (also shown in FIG. 1) that extends from the flat face 50, and a bore 54 which is positioned within the annular portion 52. Referring to FIG. 2B, the other side of the mounting piece 44 has a pair of V-shaped channel members 56 spaced to form a V-shaped channel 58, with the V-shaped channel 58 being in fluid communication with the bore 54. The two ends of the V-shaped channel 58 terminate in a pair of liquid dispensing holes 60 (see FIG. 2E) formed in the nose-shaped member 40. As shown in FIG. 2B, the V-shaped flow directing member 46 is shaped to fit over and enclose the V-shaped channel 58 so that when the liquid candy 15 is pumped from an aperture in the supply tube 12, the liquid candy 15 flows through the bore 54, into the V-shaped channel 58, and to the two liquid dispensing holes 60, without leakage of the liquid candy 15 into the hollow interior portion 48 of the nose-shaped member 40.

As shown in FIG. 2E, which is a bottom view of the nose-shaped member 40, the nose-shaped member 40 has a pair of simulated nostrils in the form of two concave areas 62, and the two liquid dispensing holes 60 are positioned to coincide with the two concave areas 62. When the nose-shaped member 40 is positioned upside down, with the concave areas 62 facing upwards, the liquid candy 15 pumped out the liquid dispensing holes 60 may pool in the concave areas 62, from which areas 62 the liquid candy 15 may be licked.

As shown in FIG. 2C, the V-shaped flow directing member 46 has a pair of V-shaped channel members 66 that are spaced farther apart than the V-shaped channel members 56 of the mounting piece 44. Consequently, referring to FIGS. 2B and 2C, when the flow directing member 46 is mounted on the mounting piece 46, the combination of the V-shaped channel members 56 and the V-shaped channel members 66 form the liquid-tight V-shaped channel 58 described above.

The mounting piece 44 may be fixed to the nose-shaped piece 42 in any conventional manner, such as by a plurality of mounting rods 70 integrally formed with the mounting piece 44 which fit into a plurality of mounting rod receptacles 72 integrally formed with the nose-shaped piece 42.

As shown in FIG. 2A, the nose-shaped piece 42 may have a plurality of apertures 74 formed therein, and as shown in FIG. 2B, the nose-shaped piece 42 may have a plurality of simulated nose defects 76, such as warts or moles, for example. The simulated nose defects 76 may be provided by a single piece of material, that acts as a base, from which each of the nose defects 76 extends. In that case, the single piece of material would be disposed within the hollow interior portion 48 of the nose-shaped member 40 so that the nose defects 76 extend through the apertures 74 so that the defects 76 are visible on the exterior of the nose-shaped member 40. By providing the nose defects 76 as a separate piece of material, which can be composed of a different colored material than the nose-shaped piece 42, the need to color the nose-shaped member 40 with paints or inks that may be inadvertently consumed by the user may be avoided. A simulated band-aid 78 may also be provided on the nose-shaped member 40.

Referring to FIGS. 3A–3D, in another embodiment of the candy dispenser 10, the body part member 18 may comprise a foot-shaped member 80. The foot-shaped member 80 may comprise a foot-shaped piece 82, a foot-shaped mounting piece 84 coupled to the foot-shaped piece 82 that facilitates mounting of the foot-shaped member 80 to the liquid candy supply tube 12, and a W-shaped flow-directing member 86 disposed within a hollow portion 87 within the foot-shaped member 80.

Figure 3A:
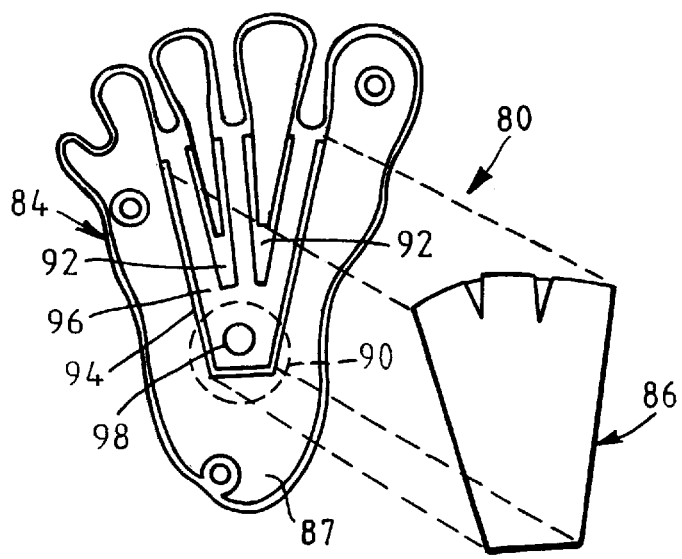
FIGS. 3A–3D show various views of a foot-shaped member that can be utilized with the liquid candy dispenser of FIG.
Figure 3B:
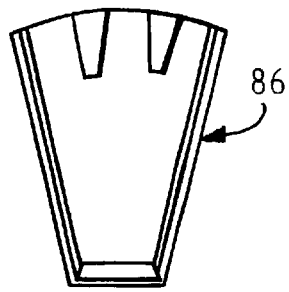
Figure 3C:
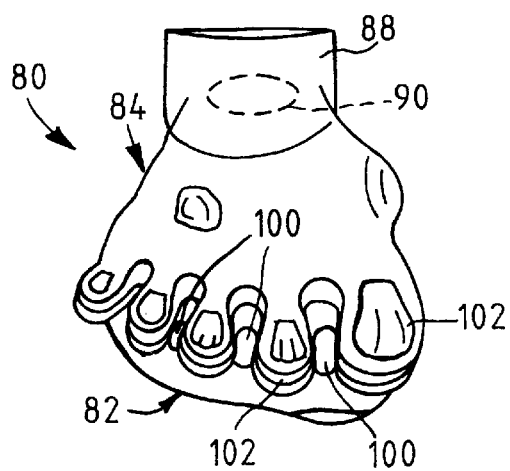
Figure 3D:
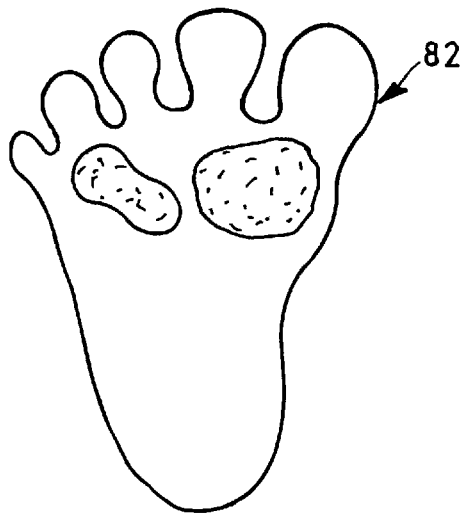

Referring to FIG. 3C, the mounting piece 84 has an annular portion 88 that mounts to the end of the supply tube 12 and a bore 90 which is positioned within the annular portion 88. Referring to FIG. 3A, the other side of the mounting piece 84 has two inner V-shaped channel guides 92 and an outer, larger V-shaped guide 94 which are spaced to form a generally W-shaped channel 96 which is in fluid communication with a circular liquid inlet 98 and three liquid dispensing holes 100 (FIG. 3C).

As shown in FIG. 3A, the W-shaped flow directing member 86 is shaped to fit over and enclose the W-shaped channel 96 so that when the liquid candy 15 is pumped from an aperture in the supply tube 12, the liquid candy 15 flows through the bore 90 and the fluid inlet 98, into the W-shaped channel 96, and to the three liquid dispensing holes 100, without leakage of the liquid candy 15 into the hollow interior portion 87 of the foot-shaped member 80. As shown in FIG. 3C, the foot-shaped member 80 has a plurality of toes 102, and the liquid dispensing holes 100 are positioned between the toes 102.

Referring to FIGS. 4A–4C, in another embodiment of the candy dispenser 10, the body part member 18 may comprise an ear-shaped member 120. The ear-shaped member 120 may comprise an ear-shaped piece 122, an ear-shaped mounting piece 124 coupled to the ear-shaped piece 122 that facilitates mounting of the ear-shaped member 120 to the liquid candy supply tube 12, and a simulated earring piece 126.

Referring to FIG. 4B, the outer side of the mounting piece 124 has a raised annular portion 128 that mounts to the end of the supply tube 12 and a bore 130 which is positioned within the raised annular portion 128. As shown in FIG. 4A, the inner side of the mounting piece 124 has a raised annular portion 132 disposed concentrically with the bore 130.

Referring to FIG. 4B, the inner side of the ear-shaped piece 122 has an annular raised portion 134 having an inside diameter that is substantially the same as the outer diameter of the raised portion 132 of the mounting piece 124. Consequently, when the two pieces 122, 124 are mated together so that the annular portion 132 mates with the annular portion 134, a substantially liquid tight flow channel 136 is formed so that no liquid candy can escape to an interior portion 138 of the ear-shaped member 120.

In use, the liquid candy 15 is pumped from the supply tube 12, through the bore 130, into the flow channel 136, and through a dispensing hole 140 formed in the ear-shaped member 122. The dispensing hole 140 is positioned to coincide with a simulated ear cavity 142 (FIG. 4C) having a generally concave shape formed in the ear-shaped member 122. When the ear-shaped member 120 is positioned so that the concave ear cavity 142 faces upwards, the liquid candy 15 pumped out the liquid dispensing hole 140 may pool in the concave area 142 and the liquid candy 15 may be licked from that area.

Referring to FIGS. 5A–5D, in another embodiment of the candy dispenser 10, the body part member 18 may comprise a generally spherical, eye-shaped member 160. The eye-shaped member 160 may comprise an eyeball-shaped piece 162, a mounting piece 164 that facilitates mounting of the eye-shaped member 160 to the liquid candy supply tube 12, a retaining piece 166 that retains the eyeball-shaped piece 162 to the mounting piece 164, and a flow-directing member 168 disposed within a hollow portion 170 within the eye-shaped member 160. The eyeball-shaped piece 162 and the mounting piece 164 may be relatively thin and bowl-shaped, for example, so that the hollow interior portion 170 is generally spherical.

Referring to FIG. 5A, the mounting piece 164 has a raised annular portion 172 that mates with the end of the supply tube 12, a cylindrical depression 174 which is coaxially positioned within the annular portion 172, and a liquid inlet bore 176 that passes through the mounting piece 164. The inner side of the mounting piece 164 has a U-shaped guide channel member 178 that forms part of a linear flow channel 180 between the liquid inlet 176 and a liquid dispensing hole 182 formed in a corner of the eyeball-shaped piece 162.

As shown in FIG. 5A, the flow directing member 168 is shaped to fit over and enclose the channel 180 so that when the liquid candy 15 is pumped from an aperture in the supply tube 12, the liquid candy 15 flows through the cylindrical depression 174, through the liquid inlet 176, into the linear flow channel 180, and out of the liquid dispensing hole 182, without leakage of the liquid candy 15 into the hollow interior portion 170 of the eye-shaped member 160.

Referring to FIG. 5C, which shows the internal side of the pieces 162, 166, the eyeball-shaped piece 162 may be retained between the retaining member 166 and the mounting piece 164 via a plurality of tabs 190 integrally formed with the eyeball-shaped piece 162. The tabs 190 prevent the eyeball-shaped piece 162 from passing through a relatively large diameter circular opening 192 formed in the retaining member 166. As in the other embodiments described above, the eyeball-shaped piece may be composed of a plurality of separate pieces of material, each being of a different color.

As described above, each of the embodiments of the liquid candy dispenser 10 has a body part member 18 in the form of a human body part and at least one liquid candy dispensing hole that is disposed at a location on the body part member 18 at which a body part substance would be present. Thus, when the liquid candy 15 is dispensed through the dispensing hole, the liquid candy 15 simulates the presence of the body-part substance on the human body part.

All of the pieces of the body part members described above could be composed of a non-edible material, such as plastic, having substantially no flavor or taste associated therewith so that the liquid candy 15 does not have any flavor or taste interaction with the body part members.

The pieces of the body part members may be composed of injection-molded plastic, for example. In such case, it may be desirable to have all portions of the pieces to have generally the same thickness in accordance with generally known injection molding principles. In that case, it may be desirable to provide the body part members with hollow interior portions and internal flow directors, as described above, so that no significant portion of the liquid candy pools within the hollow portions of the body part members.

Numerous modifications and alternative embodiments of the invention will be apparent to those skilled in the art in view of the foregoing description. This description is to be construed as illustrative only, and is for the purpose of teaching those skilled in the art the best mode of carrying out the invention. The details of the structure and method may be varied substantially without departing from the spirit of the invention, and the exclusive use of all modifications which come within the scope of the appended claims is reserved.

What is claimed is:

1. A liquid candy dispenser, comprising:
   a liquid candy supply member having an internal cavity;
   a supply of liquid candy disposed in said internal cavity of said liquid candy supply member;
   a body part member shaped in the form of a body part, said body part member being selected from the group of shaped members consisting of an ear-shaped member, a nose-shaped member and an eye-shaped member;
   a liquid conduit fluidly coupled to said liquid candy supply member, said liquid conduit passing through said body part member, said liquid conduit being composed of a material having substantially no flavor or taste associated therewith, and said liquid candy not having any flavor or taste interaction with said body part member when said liquid candy is forced from said internal cavity of said liquid candy supply member through said liquid conduit.

2. A liquid candy dispenser as recited in claim 1 wherein said body part member and said liquid conduit are shaped so that there is a hollow interior space disposed between said liquid conduit and an interior portion of said body part member when said liquid conduit is disposed within said body part member and wherein said liquid conduit prevents said liquid candy from passing into said hollow interior space when said liquid candy is forced from said internal cavity of said liquid candy supply member through said liquid conduit.

3. A liquid candy dispenser, comprising:

a liquid candy supply member having an internal cavity;

a supply of liquid candy disposed in said internal cavity of said liquid candy supply member;

a body part member shaped in the form of a human body part;

a liquid candy dispensing hole formed in said body part member, said liquid candy dispensing hole being formed in said body part member at a location corresponding to an area of said body part at which a body-part substance would be present;

a liquid conduit fluidly coupled between said liquid candy supply member and said liquid candy dispensing hole; and a pumping mechanism associated with said liquid candy supply member that forces liquid candy from said internal cavity of said liquid candy supply member, through said liquid conduit fluidly coupled between said liquid candy supply member and said liquid candy dispensing hole, and out of said liquid candy dispensing hole so that said liquid candy exits said dispensing hole formed in said body part member to simulate the presence of said body-part substance on said human body part, wherein said body part member is selected from the group of shaped members consisting of an ear-shaped member, a nose-shaped member, and foot-shaped member, wherein said body part member has a simulated ear canal and wherein said liquid candy dispensing hole is formed to coincide with said simulated ear canal if said body part member comprises said ear-shaped member, wherein said body part member has a simulated nostril and wherein said liquid candy dispensing hole is formed to coincide with said simulated nostril if said body part member comprises said nose-shaped member, and wherein said body part member has a plurality of toes and wherein said liquid candy dispensing hole is formed at a location on said foot-shaped member if said body part member comprises said foot-shaped member.

4. A liquid candy dispenser as recited in claim 3 wherein said body part member is composed of a non-edible material having substantially no flavor or taste associated therewith.

5. A liquid candy dispenser as recited in claim 3 wherein said body part member is composed of a plastic material having substantially no flavor or taste associated therewith.

6. A liquid candy dispenser as recited in claim 3 wherein said body part member comprises a first body part piece and a second body part piece, said first body part piece being composed of a plastic material having a first color and said second body part piece being composed of a plastic material having a second color different than said first color.

7. A liquid candy dispenser as recited in claim 3 wherein said body part member has a hollow interior portion and wherein said liquid conduit is shaped so as to prevent said liquid candy from entering said hollow interior portion of said body part member when said pumping mechanism causes said liquid candy to be forced from said internal cavity of said liquid candy supply member out of said liquid candy dispensing hole.

8. A liquid candy dispenser, comprising:

a liquid candy supply member having an internal cavity;

a supply of liquid candy disposed in said internal cavity of said liquid candy supply member;

a body part member shaped in the form of a human body part;

a liquid candy dispensing hole formed in said body part member, said liquid candy dispensing hole being formed in said body part member at a location corresponding to an area of said body part at which a body-part substance would be present;

a liquid conduit fluidly coupled between said liquid candy supply member and said liquid candy dispensing hole; and a pumping mechanism associated with said liquid candy supply member that forces liquid candy from said internal cavity of said liquid candy supply member, through said liquid conduit fluidly coupled between said liquid candy supply member and said liquid candy dispensing hole, and out of said liquid candy dispensing hole so that said liquid candy exits said dispensing hole formed in said body part member to simulate the presence of said body-part substance on said human body part, wherein said body part member has a hollow interior portion and wherein said liquid conduit is shaped so as to prevent said liquid candy from entering said hollow interior portion of said body part member when said pumping mechanism causes said liquid candy to be forced from said internal cavity of said liquid candy supply member out of said liquid candy dispensing hole, wherein said body part member comprises an ear-shaped member, wherein said ear-shaped member has a simulated ear canal, and wherein said liquid candy dispensing hole is formed to coincide with said simulated ear canal.

9. A liquid candy dispenser, comprising:

a liquid candy supply member having an internal cavity;

a supply of liquid candy disposed in said internal cavity of said liquid candy supply member;

a body part member shaped in the form of a human body part;

a liquid candy dispensing hole formed in said body part member, said liquid candy dispensing hole being formed in said body part member at a location corresponding to an area of said body part at which a body-part substance would be present;

a liquid conduit fluidly coupled between said liquid candy supply member and said liquid candy dispensing hole; and a pumping mechanism associated with said liquid candy supply member that forces liquid candy from said internal cavity of said liquid candy supply member, through said liquid conduit fluidly coupled between said liquid candy supply member and said liquid candy dispensing hole, and out of said liquid candy dispensing hole so that said liquid candy exits said dispensing hole formed in said body part member to simulate the presence of said body-part substance on said human body part, wherein said body part member has a hollow interior portion and wherein said liquid conduit is shaped so as to prevent said liquid candy from entering said hollow interior portion of said body part member when said pumping mechanism causes said liquid candy to be forced from said internal cavity of said liquid candy supply member out of said liquid candy dispensing hole, wherein said body part member comprises a nose-shaped member, wherein said nose-shaped member has a simulated nostril, and wherein said liquid candy dispensing hole is formed to coincide with said simulated nostril.

10. A liquid candy dispenser, comprising:

a liquid candy supply member having an internal cavity;

a supply of liquid candy disposed in said internal cavity of said liquid candy supply member;

a body part member shaped in the form of a human body part;

a liquid candy dispensing hole formed in said body part member, said liquid candy dispensing hole being formed in said body part member at a location corresponding to an area of said body part at which a body-part substance would be present;

a liquid conduit fluidly coupled between said liquid candy supply member and said liquid candy dispensing hole; and a pumping mechanism associated with said liquid candy supply member that forces liquid candy from said internal cavity of said liquid candy supply member, through said liquid conduit fluidly coupled between said liquid candy supply member and said liquid candy dispensing hole, and out of said liquid candy dispensing hole so that said liquid candy exits said dispensing hole formed in said body part member to simulate the presence of said body-part substance on said human body part, wherein said body part member has a hollow interior portion and wherein said liquid conduit is shaped so as to prevent said liquid candy from entering said hollow interior portion of said body part member when said pumping mechanism causes said liquid candy to be forced from said internal cavity of said liquid candy supply member out of said liquid candy dispensing hole, wherein said body part member comprises an eye-shaped member and wherein said liquid candy dispensing hole is formed at a location coinciding with a corner of said eye-shaped member.

11. A liquid candy dispenser, comprising:

a liquid candy supply member having an internal cavity;

a supply of liquid candy disposed in said internal cavity of said liquid candy supply member;

a body part member shaped in the form of a human body part;

a liquid candy dispensing hole formed in said body part member, said liquid candy dispensing hole being formed in said body part member at a location corresponding to an area of said body part at which a body-part substance would be present;

a liquid conduit fluidly coupled between said liquid candy supply member and said liquid candy dispensing hole; and a pumping mechanism associated with said liquid candy supply member that forces liquid candy from said internal cavity of said liquid candy supply member, through said liquid conduit fluidly coupled between said liquid candy supply member and said liquid candy dispensing hole, and out of said liquid candy dispensing hole so that said liquid candy exits said dispensing hole formed in said body part member to simulate the presence of said body-part substance on said human body part, wherein said body part member has a hollow interior portion and wherein said liquid conduit is shaped so as to prevent said liquid candy from entering said hollow interior portion of said body part member when said pumping mechanism causes said liquid candy to be forced from said internal cavity of said liquid candy supply member out of said liquid candy dispensing hole, wherein said body part member comprises a foot-shaped member having a plurality of toes and wherein said liquid candy dispensing hole is formed at a location on said foot-shaped member coinciding with a space between a pair of said toes.

12. A liquid candy dispenser, comprising:

a liquid candy supply member having an internal cavity;

a supply of liquid candy disposed in said internal cavity of said liquid candy supply member;

a body part member shaped in the form of a human body part, wherein said body part member is composed of a non-edible material having substantially no flavor or taste associated therewith and wherein said liquid candy does not affect the taste of said body part member;

a liquid candy dispensing hole formed in said body part member; and a liquid conduit fluidly coupled between said liquid candy supply member and said liquid candy dispensing hole so that liquid candy may flow from said internal cavity of said liquid candy supply member, through said liquid conduit fluidly coupled between said liquid candy supply member and said liquid candy dispensing hole, and out of said liquid candy dispensing hole to exit said dispensing hole formed in said body part member, wherein said body part member comprises an ear-shaped member, wherein said ear-shaped member has a simulated ear canal, and wherein said liquid candy dispensing hole is formed to coincide with said simulated ear canal.

13. A liquid candy dispenser, comprising:

a liquid candy supply member having an internal cavity;

a supply of liquid candy disposed in said internal cavity of said liquid candy supply member;

a body part member shaped in the form of a human body part, wherein said body part member is composed of a non-edible material having substantially no flavor or taste associated therewith and wherein said liquid candy does not affect the taste of said body part member;

a liquid candy dispensing hole formed in said body part member; and a liquid conduit fluidly coupled between said liquid candy supply member and said liquid candy dispensing hole so that liquid candy may flow from said internal cavity of said liquid candy supply member, through said liquid conduit fluidly coupled between said liquid candy supply member and said liquid candy dispensing hole, and out of said liquid candy dispensing hole to exit said dispensing hole formed in said body part member, wherein said body part member comprises a nose-shaped member, wherein said nose-shaped member has a simulated nostril, and wherein said liquid candy dispensing hole is formed to coincide with said simulated nostril.

14. A liquid candy dispenser, comprising:

a liquid candy supply member having an internal cavity;

a supply of liquid candy disposed in said internal cavity of said liquid candy supply member;

a body part member shaped in the form of a human body part, wherein said body part member is composed of a non-edible material having substantially no flavor or taste associated therewith and wherein said liquid candy does not affect the taste of said body part member;

a liquid candy dispensing hole formed in said body part member; and a liquid conduit fluidly coupled between said liquid candy supply member and said liquid candy dispensing hole so that liquid candy may flow from said internal cavity of said liquid candy supply member, through said liquid conduit fluidly coupled between said liquid candy supply member and said liquid candy dispensing hole, and out of said liquid candy dispensing hole to exit said dispensing hole formed in said body part member, wherein said body part member comprises an eye-shaped member and wherein said liquid candy dispensing hole is formed at a location coinciding with a corner of said eye-shaped member.

15. A liquid candy dispenser, comprising:

a liquid candy supply member having an internal cavity;

a supply of liquid candy disposed in said internal cavity of said liquid candy supply member;

a body part member shaped in the form of a human body part, wherein said body part member is composed of a non-edible material having substantially no flavor or taste associated therewith and wherein said liquid candy does not affect the taste of said body part member;

a liquid candy dispensing hole formed in said body part member; and a liquid conduit fluidly coupled between said liquid candy supply member and said liquid candy dispensing hole so that liquid candy may flow from said internal cavity of said liquid candy supply member, through said liquid conduit fluidly coupled between said liquid candy supply member and said liquid candy dispensing hole, and out of said liquid candy dispensing hole to exit said dispensing hole formed in said body part member, wherein said body part member comprises a foot-shaped member having a plurality of toes and wherein said liquid candy dispensing hole is formed at a location on said foot-shaped member coinciding with a space between a pair of said toes.

16. A liquid candy dispenser, comprising:

a liquid candy supply member having an internal cavity;

a supply of liquid candy disposed in said internal cavity of said liquid candy supply member;

a body part member shaped in the form of a body part, wherein said body part member is composed of a non-edible material having substantially no flavor or taste associated therewith and wherein said liquid candy does not affect the taste of said body part member;

a liquid candy dispensing hole formed in said body part member; and a liquid conduit fluidly coupled between said liquid candy supply member and said liquid candy dispensing hole so that liquid candy may flow from said internal cavity of said liquid candy supply member, through said liquid conduit fluidly coupled between said liquid candy supply member and said liquid candy dispensing hole, and out of said liquid candy dispensing hole to exit said dispensing hole formed in said body part member, wherein said body part member comprises a nose-shaped member, wherein said nose-shaped member has a simulated nostril, and wherein said liquid candy dispensing hole is formed to coincide with said simulated nostril.

17. A liquid candy dispenser, comprising:

a liquid candy supply member having an internal cavity;

a supply of liquid candy disposed in said internal cavity of said liquid candy supply member;

a body part structure operatively coupled to said liquid candy supply member, said body part structure comprising a body part member shaped in the form of a human ear, said body part structure not including any structure shaped in the form of a human body part other than said human ear;

a liquid candy dispensing hole;

a liquid conduit fluidly coupled to said liquid candy supply member; and a pumping mechanism associated with said liquid candy supply member that forces liquid candy from said internal cavity of said liquid candy supply member, through said liquid conduit, and out of said liquid candy dispensing hole so that said liquid candy exits said dispensing hole.

18. A liquid candy dispenser recited in claim 17 wherein said liquid candy supply member comprises a supply tube composed of a flexible material and wherein said pumping mechanism comprises a plurality of folds or creases in said supply tube.

19. A liquid candy dispenser recited in claim 17 wherein said body part member has a hollow interior portion and wherein said liquid conduit is shaped so as to prevent said liquid candy from entering said hollow interior portion of said body part member when said pumping mechanism causes said liquid candy to be forced from said internal cavity of said liquid candy supply member out of said liquid candy dispensing hole.

20. A liquid candy dispenser, comprising:

a liquid candy supply member having an internal cavity;

a supply of liquid candy disposed in said internal cavity of said liquid candy supply member;

a body part structure operatively coupled to said liquid candy supply member, said body part structure comprising a body part member shaped in the form of a human nose, said body part structure not including any structure shaped in the form of a human body part other than said human nose;

a liquid candy dispensing hole;

a liquid co conduit fluidly coupled to said liquid candy supply member; and a pumping mechanism associated with said liquid candy supply member that forces liquid candy from said internal cavity of said liquid candy supply member, through said liquid conduit, and out of said liquid candy dispensing hole so that said liquid candy exits said dispensing hole.

21. A liquid candy dispenser recited in claim 20 wherein said liquid candy supply member comprises a supply tube composed of a flexible material and wherein said pumping mechanism comprises a plurality of folds or creases in said supply tube.

22. A liquid candy dispenser recited in claim 20 wherein said body part member has a hollow interior portion and wherein said liquid conduit is shaped so as to prevent said liquid candy from entering said hollow interior portion of said body part member when said pumping mechanism causes said liquid candy to be forced from said internal cavity of said liquid candy supply member out t of said liquid candy dispensing hole.

23. A liquid candy dispenser, comprising:
a liquid candy supply member having an internal cavity;
a supply of liquid candy disposed in said internal cavity of said liquid candy supply member;
a body part structure operatively coupled to said liquid candy supply member, said body part structure comprising a body part member shaped in the form of a human eye, said body part structure not including any structure shaped in the form of a human body part other than said human eye;
a liquid candy dispensing hole;
a liquid conduit fluidly coupled to said liquid candy supply member; and
a pumping mechanism associated with said liquid candy supply member that forces liquid candy from said internal cavity of said liquid candy supply member, through said liquid conduit, and out of said liquid candy dispensing hole so that said liquid candy exits said dispensing hole.

24. A liquid candy dispenser recited in claim 23 wherein said liquid candy supply member comprises a supply tube composed of a flexible material and wherein said pumping mechanism comprises a plurality of folds or creases in s aid supply tube.

25. A liquid candy dispenser recited in claim 23 wherein said body part member has a hollow interior portion and wherein said liquid conduit is shaped so as to prevent said liquid candy from entering said hollow interior portion of said body part member when said pumping mechanism causes said liquid candy to be forced from said internal cavity of said liquid candy supply member out of said liquid candy dispensing hole.

26. A liquid candy dispenser, comprising:
a liquid candy supply member having an internal cavity;
a supply of liquid candy disposed in said internal cavity of said liquid candy supply member;
a body part structure operatively coupled to said liquid candy supply member, said body part structure comprising a body part member shaped in the form of a foot, said body part structure not including any structure shaped in the form of a body part other than said foot;
a liquid candy dispensing hole;
a liquid conduit fluidly coupled to said liquid candy supply member; and
a pumping mechanism associated with said liquid candy supply member that forces liquid candy from said internal cavity of said liquid candy supply member, through said liquid conduit, and out of said liquid candy dispensing hole so that said liquid candy exits said dispensing hole.

27. A liquid candy dispenser, comprising:
a liquid candy supply member having an internal cavity;
a supply of liquid candy disposed in said internal cavity of said liquid candy supply member;
a body part member shaped in the form of a human body part, wherein said body part member is composed of a non-edible material having substantially no flavor or taste associated therewith and wherein said liquid candy does not affect the taste of said body part member;
a liquid candy dispensing hole formed in said body part member; and
a liquid conduit fluidly coupled between said liquid candy supply member and said liquid candy dispensing hole so that liquid candy may flow from said internal cavity of said liquid candy supply member, through said liquid conduit fluidly coupled between said liquid candy supply member and said liquid candy dispensing hole, and out of said liquid candy dispensing hole to exit said dispensing hole formed in said body part member,
wherein said body part member comprises a body part structure selected from the group of body part structures consisting of:
a first body part structure comprising a body part member shaped in the form of a eye, said first body part structure not including any structure shaped in the form of a body part other than said eye;
a second body part structure comprising a body part member shaped in the form of a nose, said second body part structure not including any structure shaped in the form of a body part other than said nose;
a third body part structure comprising a body part member shaped in the form of an ear, said third body part structure not including any structure shaped in the form of a body part other than said ear; and
a fourth body part structure comprising a body part member shaped in the form of a foot, said fourth body part structure not including any structure shaped in the form of a body part other than said foot.

28. A liquid candy dispenser, comprising:
a liquid candy supply member having an internal cavity;
a supply of liquid candy disposed in said internal cavity of said liquid candy supply member;
a body part member shaped in the form of a body part, wherein said body part member is composed of a non-edible material having substantially no flavor or taste associated therewith and wherein said liquid candy does not affect the taste of said body part member;
a liquid candy dispensing hole formed in said body part member; and
a liquid conduit fluidly coupled between said liquid candy supply member and said liquid candy dispensing hole so that liquid candy may flow from said internal cavity of said liquid candy supply member, through said liquid conduit fluidly coupled between said liquid candy supply member and said liquid candy dispensing hole, and out of said liquid candy dispensing hole to exit said dispensing hole formed in said body part member,
wherein said body part member comprises a body part structure selected from the group of body part structures consisting of:

a first body part structure comprising a body part member shaped in the form of a eye, said first body part structure not including any structure shaped in the form of a body part other than said eye;

a second body part structure comprising a body part member shaped in the form of a nose, said second body part structure not including any structure shaped in the form of a body part other than said nose;

a third body part structure comprising a body part member shaped in the form of an ear, said third body part structure not including any structure shaped in the form of a body part other to said ear; and a fourth body part structure comprising a body part member shaped in the form of a foot, said fourth body part structure not including any structure shaped in the form of a body part other than said foot.

29. A liquid candy dispenser, comprising:

a liquid candy supply member having an internal cavity;

a supply of liquid candy disposed in said internal cavity of said liquid candy supply member;

a body part member shaped in the form of a body part;

a liquid conduit fluidly coupled to said liquid candy supply member, said liquid conduit passing through said body part member, said body part member and said liquid conduit being shaped so that there is a hollow interior space disposed between said liquid conduit and an interior portion of said body part member when said liquid conduit is disposed within said body part member, said liquid conduit preventing said liquid candy from passing into said hollow interior space when said liquid candy is forced from said internal cavity of said liquid candy supply member through said liquid conduit, said liquid conduit being composed of a material having substantially no flavor or taste associated therewith, and said liquid candy not having any flavor or taste interaction with said body part member when said liquid candy is forced from said internal cavity of said liquid candy supply member through said liquid conduit, wherein said body part member comprises a body part structure selected from the group of body part structures consisting of:

a first body part structure comprising a body part member shaped in the form of a eye, said first body part structure not including any structure shaped in the form of a body part other than said eye;

a second body part structure comprising a body part member shaped in the form of a nose, said second body part structure not including any structure shaped in the form of a body part other than said nose;

a third body part structure comprising a body part member shaped in the form of an ear, said third body part structure not including any structure shaped in the form of a body part other than said ear; and a fourth body part structure comprising a body part member shaped in the form of a foot, said fourth body part structure not including any structure shaped in the form of a body part other than said foot.

* * * * *

UNITED STATES PATENT AND TRADEMARK OFFICE
CERTIFICATE OF CORRECTION

PATENT NO.     : 6,368,646 B1
DATED          : April 9, 2002
INVENTOR(S)    : Menow et al.

It is certified that error appears in the above-identified patent and that said Letters Patent is hereby corrected as shown below:

<u>Title page,</u>
Item [75], change the inventor's name from "Monow" to -- Menow --.

Signed and Sealed this

Eleventh Day of February, 2003

JAMES E. ROGAN
*Director of the United States Patent and Trademark Office*